United States Patent
Yamada

(10) Patent No.: US 7,439,984 B2
(45) Date of Patent: Oct. 21, 2008

(54) IMAGE SIGNAL PROCESSING METHOD, IMAGE SIGNAL PROCESSING APPARATUS, AND IMAGE DISPLAYING APPARATUS

(75) Inventor: Kazuhiro Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 474 days.

(21) Appl. No.: 10/542,052

(22) PCT Filed: Mar. 2, 2005

(86) PCT No.: PCT/JP2005/004019

§ 371 (c)(1),
(2), (4) Date: Jul. 11, 2005

(87) PCT Pub. No.: WO2005/086474

PCT Pub. Date: Sep. 15, 2005

(65) Prior Publication Data

US 2006/0033749 A1 Feb. 16, 2006

(30) Foreign Application Priority Data

Mar. 5, 2004 (JP) ............................. 2004-061997
Mar. 9, 2004 (JP) ............................. 2004-065197

(51) Int. Cl.
*G09G 5/02* (2006.01)
*G09G 3/20* (2006.01)
*G09G 5/00* (2006.01)
*G06T 1/00* (2006.01)
*G06F 15/00* (2006.01)
*G02B 26/02* (2006.01)
*H04N 9/16* (2006.01)

(52) U.S. Cl. ........................ 345/589; 345/581; 345/207; 345/63; 345/77; 348/602; 348/674; 348/687; 359/292; 359/587; 349/68

(58) Field of Classification Search ............... 345/581, 345/589, 428, 595, 601–602, 36, 548–549, 345/63–64, 48, 76–88; 348/602–604, 599, 348/649, 615–617, 672–675, 687, 708, 807–808; 358/515–525; 382/162–167; 359/292, 587; 349/68–70

See application file for complete search history.

(56) References Cited

U.S. PATENT DOCUMENTS 6,034,656 A 3/2000 Yamamoto et al.

(Continued)

FOREIGN PATENT DOCUMENTS

| EP | 1 347 434 | 9/2003 |
| JP | 6-169437 | 6/1994 |
| JP | 6-230760 | 8/1994 |
| JP | 10-153983 | 6/1998 |
| JP | 2001-051652 | 2/2001 |
| JP | 2001-296820 | 10/2001 |
| JP | 2001-309280 | 11/2001 |
| JP | 2002-062856 | 2/2002 |

OTHER PUBLICATIONS

Supplementary European Search Report issued Sep. 6, 2007 in EP 05 72 0291, which is a foreign counterpart of the present U.S. application.

*Primary Examiner*—Wesner Sajous
(74) *Attorney, Agent, or Firm*—Wenderoth, Lind and Ponack, L.L.P.

(57) ABSTRACT

An image signal processing method for performing nonlinear compensation on an image signal to be fed into a display device (103). The characteristics of nonlinear compensation are changed according to the brightness of a place in which the display device (103) is installed. This method can make the characteristics of brightness of human beings feel linear with respect to an image signal, even when the display luminance of the display device (103) is uniformly increased by the influence of ambient light.

9 Claims, 7 Drawing Sheets

U.S. PATENT DOCUMENTS

| | | |
|---|---|---|
| 2001/0006377 A1 | 7/2001 | Kasahara et al. |
| 2001/0035850 A1 | 11/2001 | Okamoto et al. |
| 2002/0036716 A1 | 3/2002 | Ito et al. |
| 2002/0044122 A1* | 4/2002 | Kuwata et al. ............ 345/88 |
| 2002/0180677 A1* | 12/2002 | Koyama ............ 345/88 |
| 2003/0020725 A1 | 1/2003 | Matsuda |
| 2003/0052841 A1 | 3/2003 | Tanaka et al. |
| 2003/0058252 A1 | 3/2003 | Matsuda et al. |
| 2003/0147053 A1 | 8/2003 | Matsuda et al. |
| 2005/0001553 A1* | 1/2005 | Han ............ 315/8 |
| 2005/0063586 A1* | 3/2005 | Munsil et al. ............ 382/162 |
| 2005/0078101 A1* | 4/2005 | Shigeta ............ 345/204 |
| 2006/0055829 A1* | 3/2006 | De Haan ............ 348/675 |

* cited by examiner

| Input gradation | Display gradation |
|---|---|
| 0 | 0 |
| 10 | 0.2 |
| 20 | 0.9 |
| 30 | 2.3 |
| 40 | 4.3 |
| 50 | 7.1 |
| 60 | 10.6 |
| 70 | 14.8 |
| 80 | 19.9 |
| 90 | 25.8 |
| 100 | 32.5 |
| 110 | 40.1 |
| 120 | 48.6 |
| 130 | 57.9 |
| 140 | 68.2 |
| 150 | 79.4 |
| 160 | 91.5 |
| 170 | 104.5 |
| 180 | 118.5 |
| 190 | 133.5 |
| 200 | 149.4 |
| 210 | 166.4 |
| 220 | 184.3 |
| 230 | 203.2 |
| 240 | 223.2 |
| 250 | 244.1 |

FIG. 9A – PRIOR ART
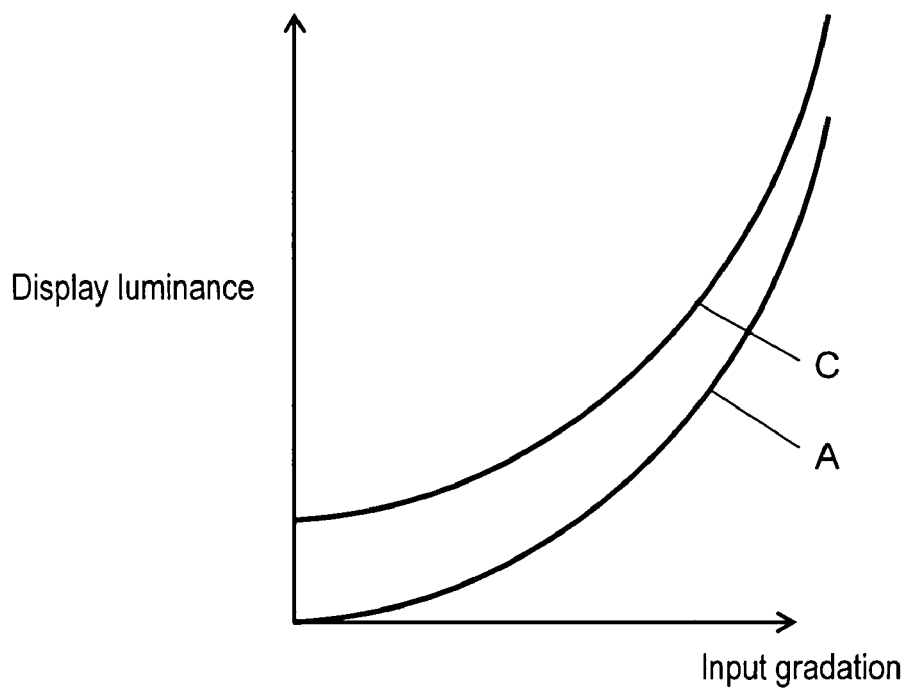
FIG. 9B – PRIOR ART
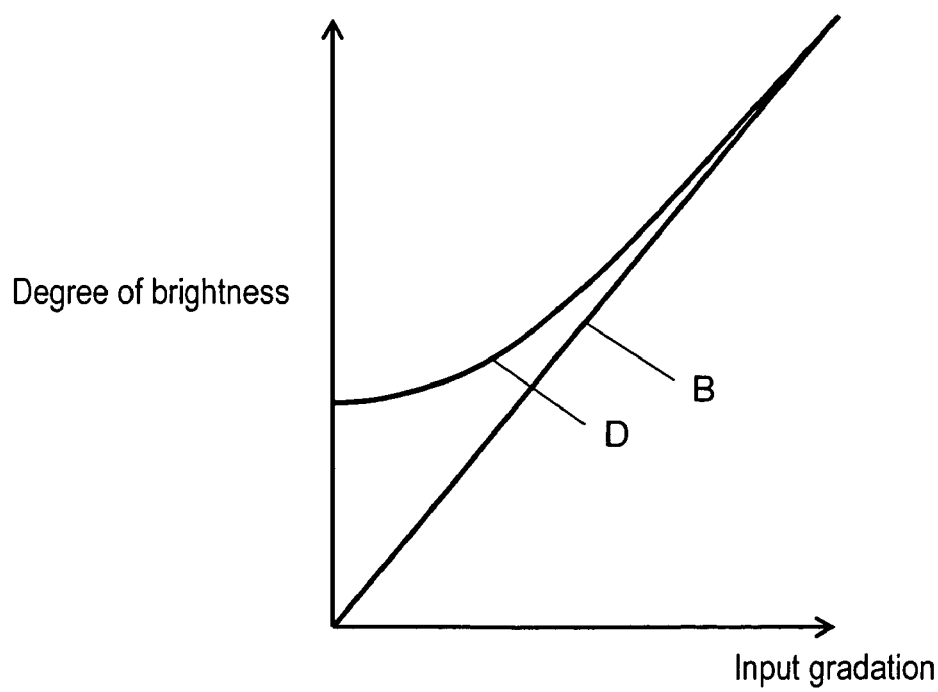

IMAGE SIGNAL PROCESSING METHOD, IMAGE SIGNAL PROCESSING APPARATUS, AND IMAGE DISPLAYING APPARATUS

BACKGROUND OF THE INVENTION

1. Field of the Invention

The present invention relates to an image signal processing method and unit for performing nonlinear compensation on image signals, and to an image display device using the method and unit.

2. Description of the Related Art

Human visual characteristics are nonlinear. In particular, the degree of brightness human beings feel has characteristics of a logarithmic function with respect to luminance, as shown in FIG. 5. In a cathode ray tube (CRT), the display luminance with respect to an image signal has so-called gamma characteristics, as shown in FIG. 6A. Thus, in a display device using CRTs, the gamma characteristics and visual characteristics of a logarithmic function cancel out each other and the degree of brightness human beings feel has characteristics substantially linear with respect to image signals.

In contrast, newly-developed display devices, such as a digital mirror device (DMD) and plasma display panel (PDP), do not have the gamma characteristics. As shown in FIG. 6B, these display devices have characteristics in which the display luminance is linear with respect to image signals. Therefore, in these display devices, the degree of brightness human beings feel exhibits characteristics of a logarithmic function with respect to image signals. For this reason, to compensate the degree of brightness of image signals human beings feel to have linear characteristics, nonlinear compensation must be performed on the image signals. Proposed as one of the methods is using a look-up table (hereinafter abbreviated as "LUT") to perform nonlinear compensation, as shown in FIG. 7 (see Japanese Patent Unexamined Publication H10-153983, for example).

FIG. 8 is a table showing an example of input-output characteristics in such a LUT. In this table, "input gradation" is an image signal before compensation, and the signal levels of the image signals to be fed into the LUT are expressed in 256 steps, i.e. "0" to "255". "Display gradation" is an image signal after compensation, and the signal levels supplied from the LUT are standardized so that the maximum value thereof is "255". In FIG. 8, the display gradations are shown only when the input gradations are "0", "10", "20", and so on, to "250".

When a display device is installed in a dark place, and no ambient light incident on the display device, nonlinear compensation is performed on the input gradations to be fed into a display device having no gamma characteristics, such as a PDP, as shown in FIG. 8. Then, the relation between the input gradation and display luminance exhibits gamma characteristics, as shown by characteristic curve A in FIG. 9A. Thus, the degree of brightness human beings feel and input gradations are substantially linear, as shown by characteristics curve B in FIG. 9B.

However, when the display device is installed in a bright place, the display luminance is uniformly increased by the influence of ambient light, as shown by characteristic curve C in FIG. 9A. Thus, even the conventional nonlinear compensation cannot return the degree of brightness human beings feel so as to have linear characteristics. Characteristic curve D in FIG. 9B shows the degree of brightness human beings feel with respect to the input gradations at that time. Human beings cannot recognize a change in gradation clearly in the portion of low input gradations.

This phenomenon depends on the human visual characteristics and can be considered as follows. Assume that the display gradations shown in FIG. 8 indicate the display luminance in a dark place. Then, when the input gradation increases from 10 gradations to 20 gradations, the display luminance increases "0.2" to "0.9", thus making human beings feel that the brightness is 4.5 times. In contrast, assume the display luminance increases by a luminance corresponding to "30", for example, in a bright place, under the influence of ambient light incident to the display device. In this case, even when the input gradation increases from 10 gradations to 20 gradations, the display luminance increases from "30.2" to "30.9" only. Thus, human beings almost cannot feel a change in brightness. Of course, for a brighter image, the ratio of the display luminance between 240 gradations and 250 gradations in a dark place, for example, is 244.1/223.2=1.09. The ratio between the same gradations in a bright place is 274.1/253.2=1.08. These figures do not have a large difference and thus the influence of ambient light is negligible.

As described above, for the conventional method of nonlinear compensation, because a display device is influenced by the ambient light incident thereon, the degree of brightness human beings feel cannot be compensated to have linear characteristics. Particularly in a dark image having low input gradations, a change in gradation cannot be recognized and the gradations become uniform.

The present invention addresses this problem and aims to provide an image signal processing method and unit capable of compensating the characteristics of brightness of image signals human beings feel, even when the display luminance of a display device has characteristics linear with respect to the image signals and the display luminance is uniformly increased by the influence of ambient light incident to the display device. The present invention also aims to provide an image display using the method and unit.

SUMMARY OF THE INVENTION

The present invention provides an image signal processing method for performing nonlinear compensation on image signals to be fed into a display device. According to the brightness of the place in which the display device is installed, the characteristics of nonlinear compensation are changed.

BRIEF DESCRIPTION OF THE DRAWINGS

FIG. 7 is a circuit block diagram of a conventional image display device.

FIG. 8 is a table showing an example of input-output characteristics in a look-up table.

FIG. 9A is a graph showing a relation between an input gradation and display luminance in a conventional image signal compensation method.

FIG. 9B is a graph showing a relation between an input gradation and a degree of brightness human beings feel.

DETAILED DESCRIPTION OF THE INVENTION

Exemplary embodiments of the present invention are hereinafter demonstrated with reference to the accompanying drawings.

First Exemplary Embodiment

Figure 1:
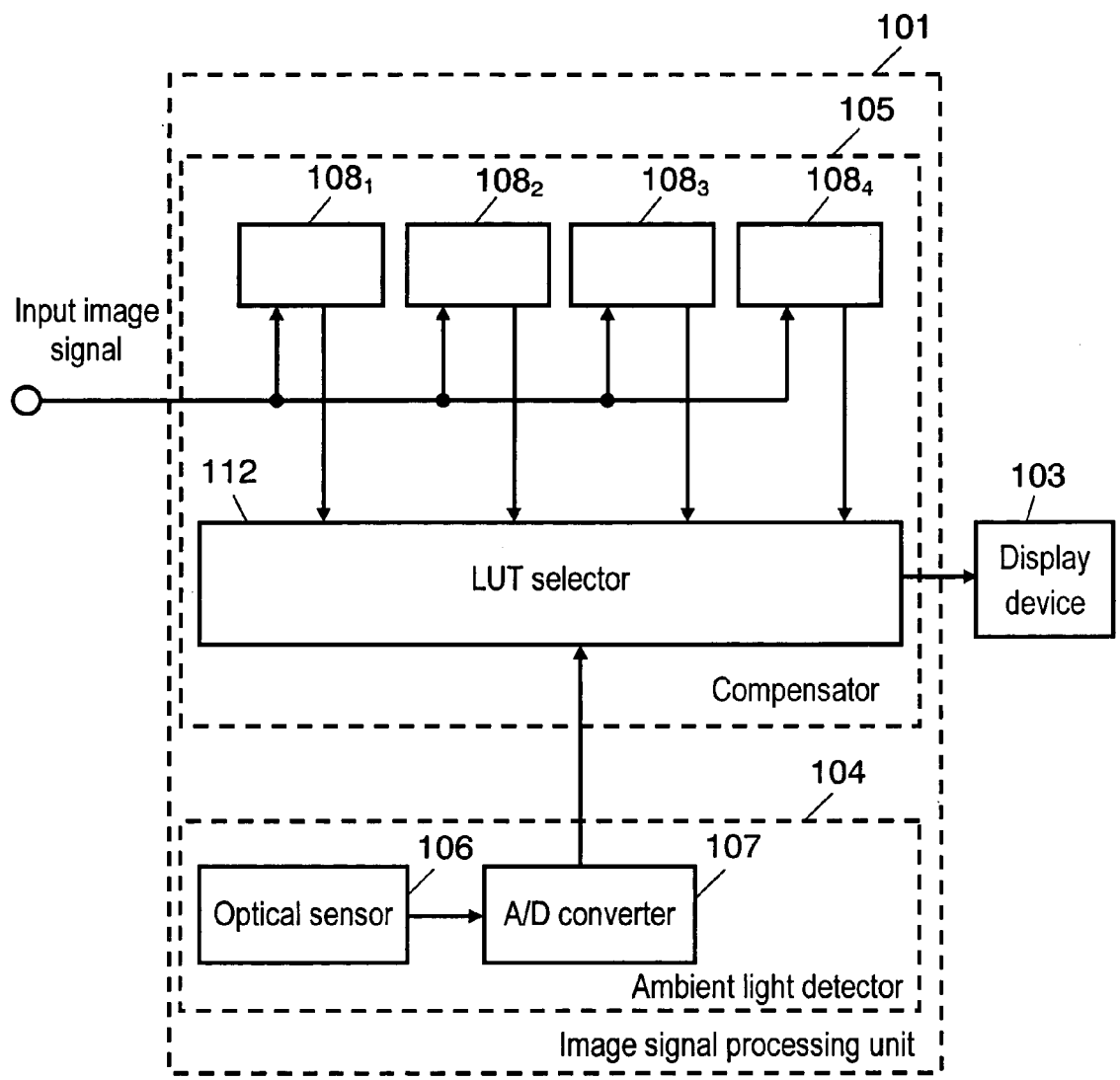
FIG. 1 is a circuit block diagram of an image display device in accordance with a first exemplary embodiment of the present invention.

FIG. 1 is a circuit block diagram of image display device 100 in accordance with a first exemplary embodiment of the present invention. Image signal processing unit 101 performs nonlinear compensation on an input image signal, i.e. input gradation, and outputs a signal to display device 103. Display device 103 is a display device having no gamma characteristics, such as a digital mirror device (DMD) and plasma display panel (PDP). Image signal processing unit 101 includes ambient light detector 104 for detecting the brightness of ambient light, and compensator 105 for performing nonlinear compensation on the input gradation according to the brightness of the ambient light.

Ambient light detector 104 includes optical sensor 106 for sensing the brightness of ambient light, and analog-to-digital (A/D) converter 107 for converting a signal sensed by optical sensor 106 to a digital signal. Compensator 105 includes a plurality of look-up tables (LUTs) $108_1$ to $108_4$ used for nonlinear compensation on the input gradation, and LUT selector 112 for selecting one LUT from among the plurality of LUTs $108_1$ to $108_4$, according to the signal detected by ambient light detector 104. FIG. 1 illustrates four LUTs $108_1$ to $108_4$; however, of course, the number of LUTs is not limited to four. An arbitrary number of LUTs can be used as required. Generally, an increased number of LUTs can accommodate a wider range of ambient light and set a change in display luminance caused by switching the LUTs smaller.

Each of the plurality of LUTs $108_1$ to $108_4$ performs nonlinear compensation on the input gradation according to the following equation:

(Display gradation)=$K$×(input gradation)$^\gamma$

Now, gamma factor $\gamma$ is a value larger than 1, which is set to a different value for each of the LUTs. Coefficient K is a coefficient for making the maximum value of the display gradation equal to the maximum value of the input gradation, and is expressed by the following equation:

$K$=(maximum value of input gradation)$^{(1-\gamma)}$

Figure 2A:
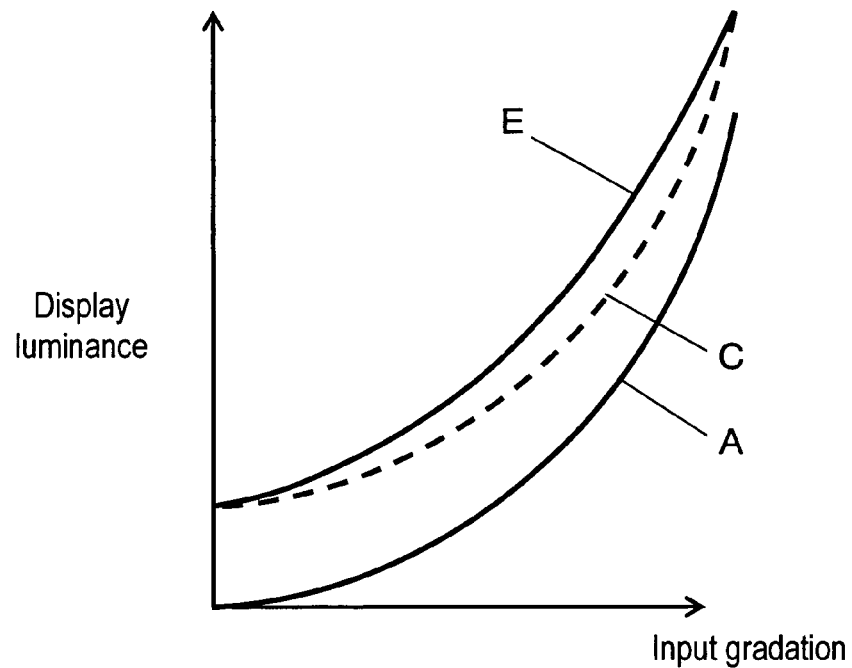
FIG. 2A is a graph showing a relation between an input gradation and display luminance in an image signal compensation method in accordance with the first exemplary embodiment.
Figure 2B:
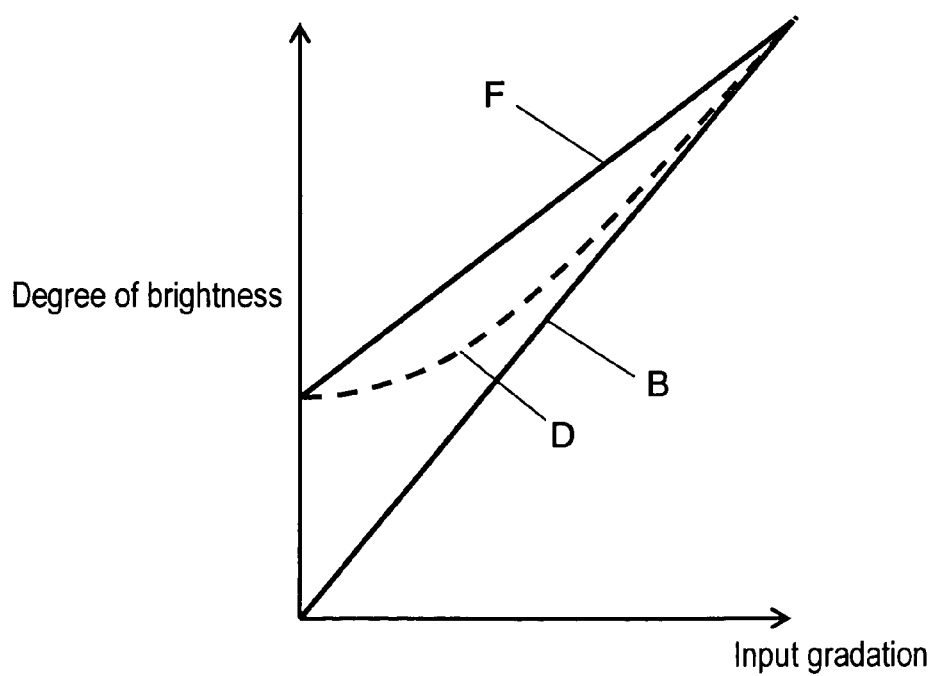
FIG. 2B is a graph showing a relation between an input gradation and a degree of brightness human beings feel.
Figure 3:
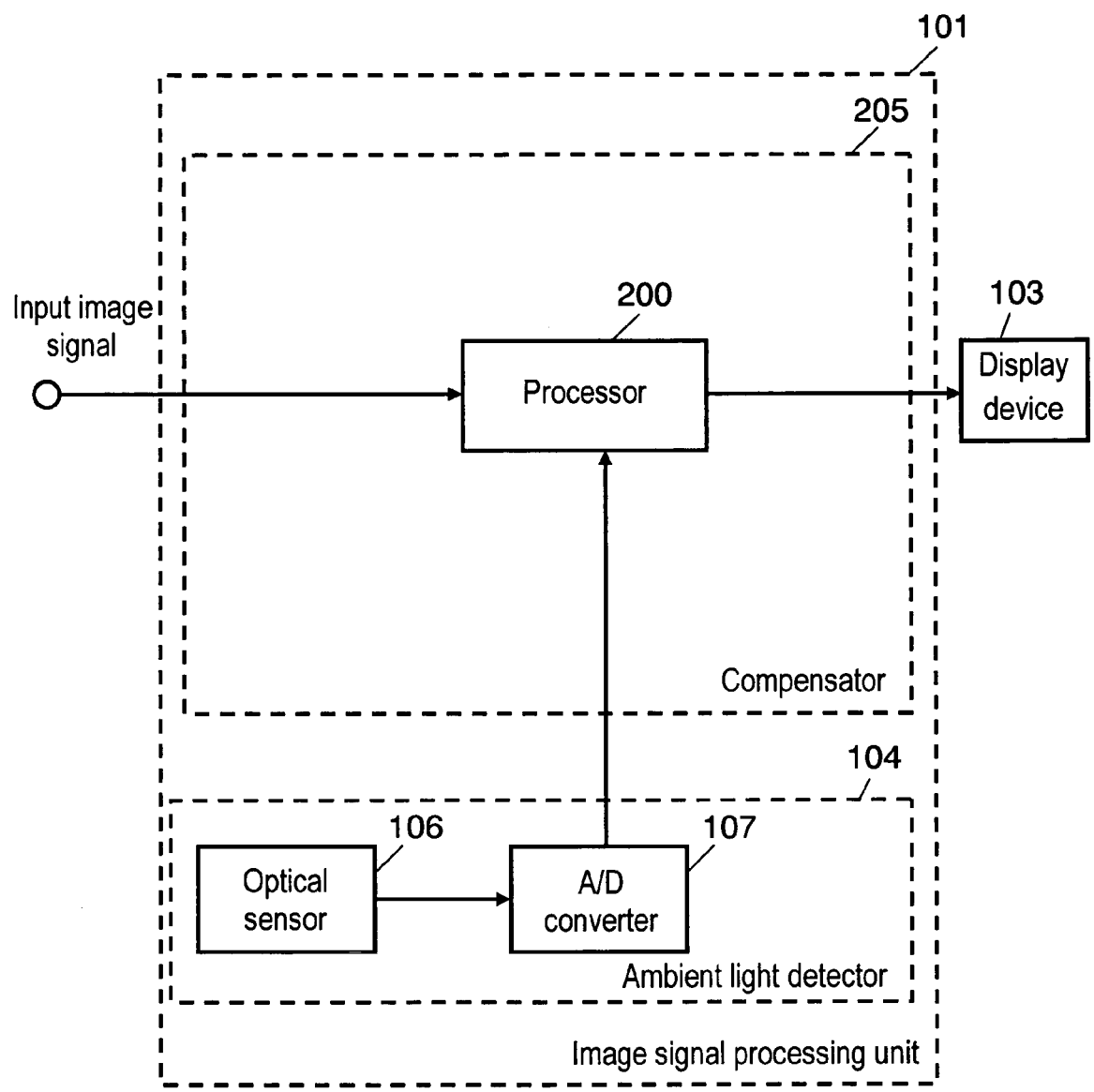
FIG. 3 is a circuit block diagram of another image display device in accordance with the first exemplary embodiment.

In this embodiment, LUT $108_1$ is a LUT for nonlinear compensation in a dark place without ambient light. In this LUT, gamma factor $\gamma$ is set to 2.2. When nonlinear compensation is performed on an input gradation using LUT $108_1$ in a dark place for image display, the relation between the input gradation and display luminance is as shown by characteristic curve A in FIG. 2A. The degree of brightness human beings feel exhibits characteristics substantially linear with respect to an input gradation, as shown in characteristic curve B in FIG. 2B. When nonlinear compensation is performed on an input gradation using LUT $108_1$ for a dark place with the display luminance uniformly increased by the influence of ambient light as shown by characteristic curve C in FIG. 2A, the linearity of the brightness human beings feel is affected, as shown by characteristic curve D in FIG. 2B, and gradations become uniform in the part of low input gradations. Therefore, in this case, nonlinear compensation is performed using LUT $108_4$ having a small gamma factor $\gamma$, as shown by characteristic curve E in FIG. 2A. Then, the degree of brightness human beings feel can be compensated so as to substantially be linear with respect to an input gradation, as shown by characteristic curve F in FIG. 2B.

In this embodiment, gamma factors $\gamma$ of four LUTs $108_1$ to $108_4$ are set to 2.2, 2.1, 2.0, and 1.9, respectively. Based on the detection results of ambient light detector 104, these LUTs are switched. However, if the characteristics of nonlinear compensation performed on an input gradation can be changed according to ambient light, another structure can also be used. For example, the function of the plurality of look-up tables and look-up table selector can be achieved by using a processor, such as a digital signal processor. An image signal processing unit can also be structured by using processor 200 as compensator 205 to input an image signal and detected signal of ambient light and output a display gradation. This structure can form a compensator with a smaller number of circuit components.

In this embodiment, the characteristics of nonlinear compensation are changed by changing the value of gamma factor $\gamma$. However, the characteristics of nonlinear compensation can be changed by other methods. For example, the characteristics of nonlinear compensation can be obtained by measuring the compensation characteristics such that the brightness human beings feel under influence of various kinds of ambient light is linear with respect to an image signal before compensation. Thus, even in a display device of which display luminance has any characteristics with respect to an image signal, the compensation characteristics such that the brightness human beings feel is linear with respect to an image signal before compensation can be obtained.

Second Exemplary Embodiment

Figure 4:
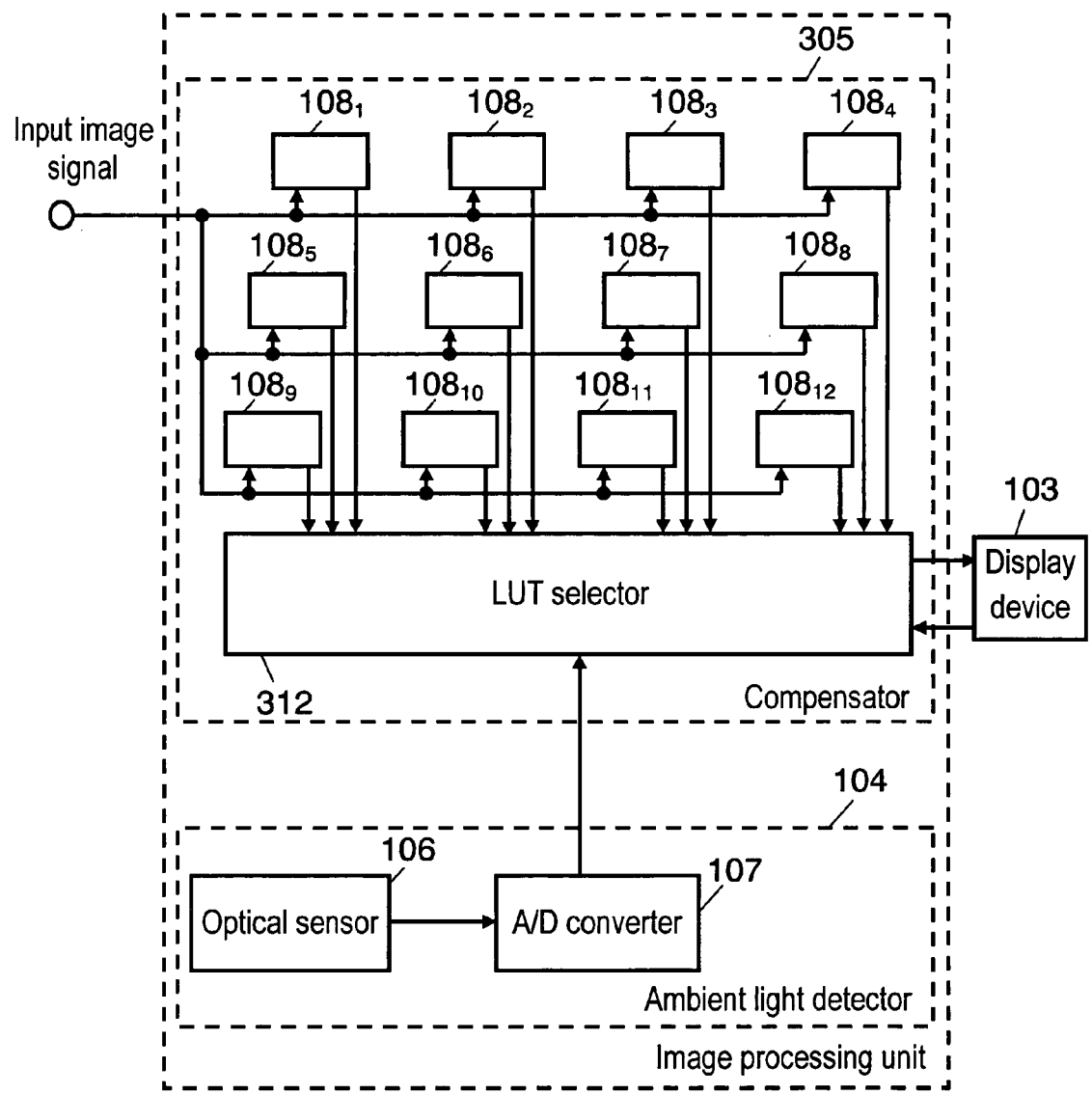
FIG. 4 is a circuit block diagram of an image display device in accordance with a second exemplary embodiment.
Figure 5:
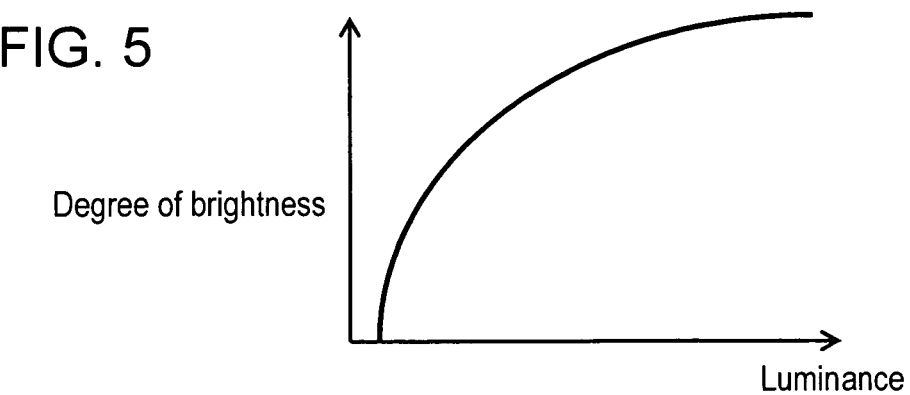
FIG. 5 is a graph showing a degree of brightness human beings feel with respect to luminance.
Figure 6A:
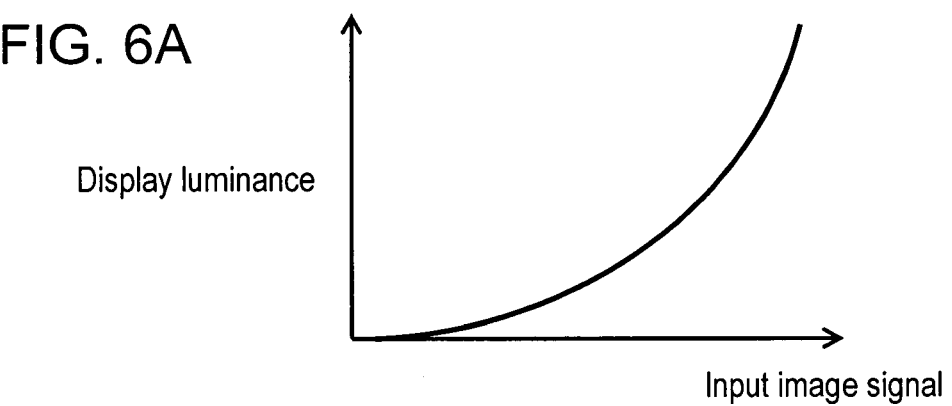
FIG. 6A is a graph showing a relation between an image signal and display luminance in a cathode ray tube (CRT).
Figure 6B:
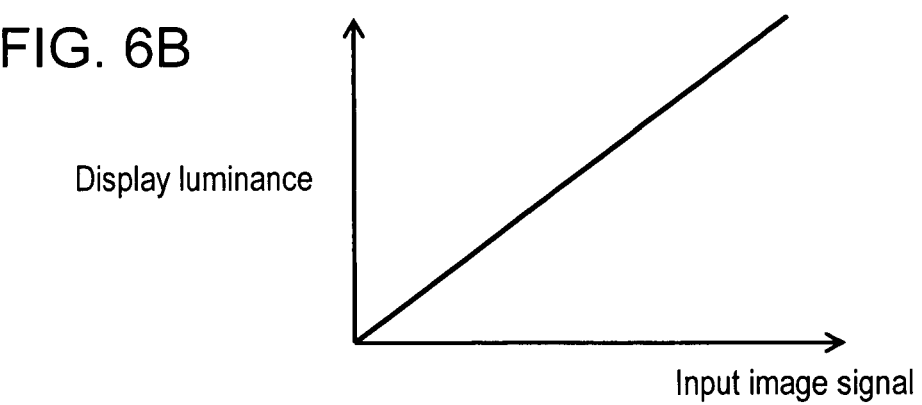
FIG. 6B is a graph showing a relation between an image signal and display luminance in a digital mirror device (DMD) and plasma display panel (PDP).
Figure 6B:
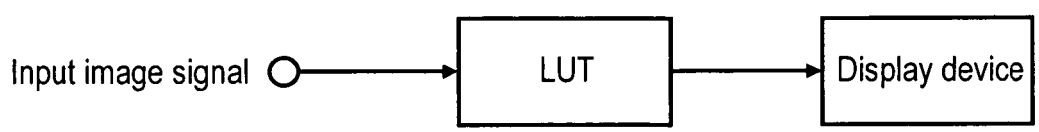

FIG. 4 is a circuit block diagram of image display device 300 in accordance with the second exemplary embodiment of the present invention. The same elements of the circuit block of the first exemplary embodiment are denoted with the same reference marks, and descriptions thereof are omitted. The second exemplary embodiment differs from the first exemplary embodiment in that the characteristics of nonlinear compensation are changed not only according to ambient light but also to the display modes of display device 103. For example, in a display device using a PDP, the number of gradations it can display (hereinafter referred to as "gradation display capability") conflicts with the maximum luminance it can display, because of its driving principle. Then, as the display modes of display device 103, "dynamic mode", "standard mode", "cinema mode", and the like are provided, so that a user can select a desired display mode. Now, in "dynamic mode", the gradation display capability is substantially given up to increase the maximum luminance. In "cinema mode", the maximum luminance is inhibited to increase the gradation display capability. "Standard mode" is an intermediate display mode between them.

As described above, the brightness human beings feel is influenced by ambient light. However, of course, the brightness is influenced directly by the luminance of a display device. For this reason, to make the brightness human beings feel linear with respect to an input gradation, the characteristics of nonlinear compensation should be changed not only according to ambient light but also to the maximum luminance a display device displays.

Compensator 305 includes a plurality of LUTs $108_1$ to $108_{12}$ used for performing nonlinear compensation on an input gradation, and LUT selector 312 for selecting one LUT from among the plurality of LUTs $108_1$ to $108_{12}$ according to a signal detected by ambient light detector 104 and a display mode signal supplied from display device 103. FIG. 4 illustrates a structure having four LUTs for each display mode, 12 LUTs in total. Of course, an arbitrary number of LUTs can be provided as required.

In the same display mode, as ambient light increases, the LUT is switched to one having a smaller gamma factor γ. When the ambient light is the same, a LUT having a larger gamma factor γ is used in "dynamic mode". In "cinema mode", a LUT having a smaller gamma factor γ is used.

By changing the characteristics of nonlinear compensation depending on not only ambient light but also on the display modes of a display device as described above, the brightness human beings feel can be compensated so as to substantially be linear with respect to an input gradation, even when a user switches the display mode to change the maximum luminance of the display device.

In the second exemplary embodiment, as a signal indicating the maximum luminance display device 103 displays, a display mode signal supplied from the display device is used. However, any other signal that indicates the maximum luminance the display device displays can be used. For example, the average picture level (APL) of an image signal before compensation can be used. Additionally, as signals indicating the maximum luminance of the display device, both of a signal indicating the display mode and the APL of an image signal can be used.

Also in the second exemplary embodiment, a plurality of LUTs is switched as compensator 305. However, any another structure for changing the characteristics of nonlinear compensation can be used. For example, compensator 305 can be structured by using a processor, such as a digital signal processor, to input an image signal, a detected signal of ambient light, and a signal indicating the maximum luminance and output a display gradation.

Also in the second exemplary embodiment, the characteristics of nonlinear compensation are changed by switching a plurality of LUTs, each having a different gamma factor γ. However, the characteristics of nonlinear compensation can be obtained by measuring the compensation characteristics such that the brightness human beings feel under influence of various kinds of ambient light and the maximum luminance of the display device is linear with respect to an input gradation.

The present invention can provide a method and unit for processing an image signal that can make the characteristics of brightness human beings feel linear with respect to an image signal, even when the display luminance of the display device is uniformly increased by the influence of ambient light. The present invention can also provide an image display device using the method and unit.

INDUSTRIAL APPLICABILITY

A method and unit for processing an image signal, and an image display device of the present invention can make the characteristics of brightness of human beings feel linear with respect to an image signal, even when the display luminance of the display device is uniformly increased by the influence of ambient light. Thus, the present invention is useful as an image display device or the like for performing nonlinear compensation on image signals.

The invention claimed is:

1. An image signal processing method for performing nonlinear compensation on an image signal to be fed into a display device, said method comprising:
   changing characteristics of nonlinear compensation according to brightness of a place in which the display device is installed such that, an image signal after nonlinear compensation is proportional to the image signal before nonlinear compensation raised to a γ-th power (γ>1), and wherein the brighter the place in which the display device is installed, the smaller a value to which γ is set.

2. The image signal processing method of claim 1, wherein characteristics of nonlinear compensation are set so that brightness human beings detect is linear with respect to the image signal before nonlinear compensation.

3. An image signal processing method for performing nonlinear compensation on an image signal to be fed into a display device, said method comprising:
   changing characteristics of nonlinear compensation according to brightness of a place in which the display device is installed and a maximum luminance that the display device displays, such that an image signal after nonlinear compensation is proportional to the image signal before nonlinear compensation raised to a γ-th power (γ>1), and wherein the brighter the place in which the display device is installed, the smaller a value to which γ is set, and the greater the maximum luminance that the display device can display, the larger the value to which γ is set.

4. An image signal processing unit for performing nonlinear compensation on an image signal to be fed into a display device, said unit comprising:
   an ambient light detector for detecting brightness of a place in which the display device is installed; and
   a compensator for receiving a detection result from said ambient light detector and for performing nonlinear compensation on the image signal to convert the image signal to an image signal after nonlinear compensation, said compensator comprising a plurality of look-up tables each having different nonlinear compensation characteristics and a look-up table selector for selecting one look-up table from aid plurality of look-up tables according to a detection result from said ambient light detector, wherein the image signal after nonlinear compensation is proportional to the image signal before nonlinear compensation raised to a γ-th power (γ>1) and the brighter the place in which the display device is installed, the smaller a value to which γ is set.

5. An image signal processing unit for performing nonlinear compensation on an image signal to be fed into a display device, said unit comprising:
   an ambient light detector for detecting brightness of a place in which the display device is installed; and
   a compensator for receiving a detection result from said ambient light detector and a signal indicating a maximum luminance that the display device displays, and for performing nonlinear compensation on the image signal to convert the image signal to an image signal after nonlinear compensation, said compensator comprising a plurality of look-up tables each having different nonlinear compensation characteristics, and a look-up table selector for selecting one look-up table from said plurality of look-up tables according to a detection result from said ambient light detector and the maximum luminance that the display device displays, wherein the image signal after nonlinear compensation is proportional to the image signal before nonlinear compensation raised to a γ-th power (γ>1) and the brighter the place in which the display device is installed, the smaller a value to which γ is set, and the greater the maximum luminence that the display device can display the larger the value to which γ is set.

6. The image signal processing unit of claim 4, wherein a function of said plurality of look-up tables and said look-up table selector is achieved by using a processor.

7. An image display device comprising said image signal processing unit of claim 4.

8. The image signal processing unit of claim 5, wherein a function of said plurality of look-up tables and said look-up table selector is achieved by using a processor.

9. An image display device comprising said image signal processing unit of claim 5.

* * * * *